Figure 1:
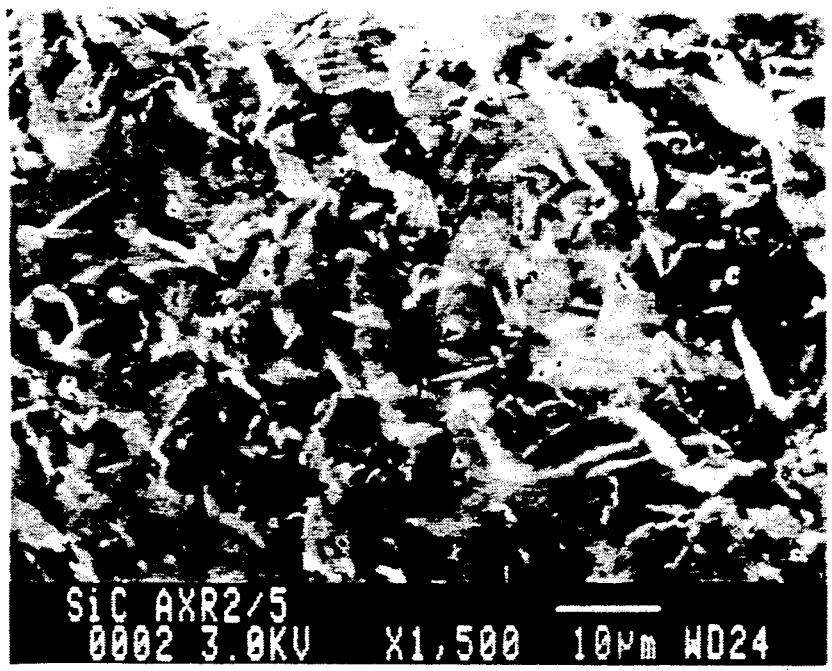

United States Patent [19]

Winder

[11] Patent Number: 5,139,719
[45] Date of Patent: Aug. 18, 1992

[54] SINTERING PROCESS AND NOVEL CERAMIC MATERIAL

[75] Inventor: Stephen M Winder, Staines, England

[73] Assignee: The British Petroleum Company p.l.c., London, England

[21] Appl. No.: 771,896

[22] Filed: Oct. 7, 1991

Related U.S. Application Data

[63] Continuation of Ser. No. 559,120, Jul. 26, 1990, abandoned.

[30] Foreign Application Priority Data

Aug. 10, 1989 [GB] United Kingdom ............ 8918319

[51] Int. Cl.$^5$ .............................................. C04B 35/56
[52] U.S. Cl. ............................................ 264/65; 264/66; 501/92
[58] Field of Search ..................... 501/92; 264/65, 66

[56] References Cited

U.S. PATENT DOCUMENTS

| | | | |
|---|---|---|---|
| 3,954,483 | 5/1976 | Prochazka | 501/92 |
| 3,968,194 | 7/1976 | Prochazka | 501/92 |
| 4,135,937 | 1/1979 | Murata et al. | 501/92 |
| 4,487,734 | 12/1984 | Sawamura | 501/92 |
| 4,555,358 | 11/1985 | Matsushita et al. | 501/92 |
| 4,762,810 | 8/1988 | Endo et al. | 501/92 |
| 4,855,263 | 8/1989 | Kawasaki et al. | 501/92 |

FOREIGN PATENT DOCUMENTS

60-255672 12/1985 Japan ................................ 501/92

*Primary Examiner*—Mark L. Bell
*Assistant Examiner*—Anthony J. Green
*Attorney, Agent, or Firm*—Heidi A. Boehlefeld; Joseph G. Curatolo; Larry W. Evans

[57] ABSTRACT

A process for the sintering of a body comprising silicon carbide and a boron-containing material, which comprises heating the body to an effective sintering temperature in the presence of nitrogen; removing the nitrogen by evacuation to a pressure of less than $10^{-2}$ mbar; and continuing the sintering under vacuum or in the presence of an inert gas other than nitrogen. The invention also describes a sintered body comprising silicon carbide and a boron-containing material, having a density of at least 96% of its theoretical maximum density, in which the body contains less than 0.7% w of free carbon, and has a mean silicon carbide grain size of less than 5 microns.

5 Claims, 1 Drawing Sheet

SINTERING PROCESS AND NOVEL CERAMIC MATERIAL

This is a file wrapper continuation of co-pending application Ser. No. 07/559,120 filed Jul. 26, 1990, abandoned.

The present invention relates to an improved sintering process and to a novel ceramic material.

Silicon carbide is a ceramic material useful for many applications, and many methods have been developed to produce bodies comprising silicon carbide having optimum properties. In particular, much research has been directed to processes for producing bodies in which the density of the material is as close as possible to the theoretical maximum.

One common technique involves pressureless sintering. This technique is described for example in Powder Metallurgy International, Vol. 10, No. 2, 1978, pp. 87–89, which describes the addition of boron and carbon to silicon carbide as sintering aids. Various pre-processes are used to produce a "green" body, which is then sintered at high temperature.

Many variants of this process are known; see for example U.S. Pat. No. 4,123,286 and U.S. Pat. No. 4,004,934. The sintering has been carried out under a range of gases or under vacuum. The major problem has been that during the sintering, large grains of material are formed irreversibly, leading to voids in the structure. Two major solutions to this problem have been proposed. One is to use a large amount of carbon as sintering aid; this tends to reduce the void content, but has the obvious disadvantage of producing materials with a high carbon content. The other solution has been to carry out the sintering in specialised furnaces, which give a very rapid rate of heating. Such treatment can be effective, but there may be problems in sintering large bodies or bodies of complex shape, and specialised furnaces are very expensive indeed.

Japanese Patent Application No. 60-5071 published Jan. 11th, 1985, is directed towards the problem of producing sintered bodies without the addition of sintering aids such as boron. It discloses a method of sintering a silicon carbide body, which comprises heating the body to an effective sintering temperature in the presence of an atmosphere containing nitrogen at a partial pressure of 20 kPa or more, and thereafter holding the body at the sintering temperature while the nitrogen partial pressure is gradually reduced by dilution with argon. The silicon carbide body contains no boron, and the process is claimed to produce high-quality dense material. Our attempts to reproduce the Examples of this Japanese document have failed to produce the desired results.

We have now found an improved process for the sintering of bodies comprising silicon carbide, which is capable of producing high-density bodies from either high- or low-carbon content material, without the need to use rapid heating.

Accordingly, the invention provides a process for the sintering of a body comprising silicon carbide and a boron-containing material, which comprises heating the body to an effective sintering temperature in the presence of nitrogen; removing the nitrogen by evacuation to a pressure of less than $10^{-2}$ mbar; and continuing the sintering under vacuum or in the presence of an inert gas other than nitrogen.

Sintering under nitrogen is known, as is sintering under other inert gases or under vacuum. The combination of the present invention, beginning the sintering under nitrogen, removing the nitrogen by evacuation, and continuing the sintering under another inert gas or under vacuum, gives surprising and most advantageous results, even with low carbon content material. The initial step of heating may be carried out under pure nitrogen or under a mixture of nitrogen and an inert gas. The starting temperature for the heating is not important, although the nitrogen should be present from the temperature at which some sintering of the body commences. This temperature is of course dependent on the material, but is generally around 1200° to 1400° C. It is usually convenient to begin the heating from room temperature. Nitrogen may be introduced at this stage, or the initial heating may be carried out under vacuum or under an inert gas other than nitrogen, nitrogen being introduced at a higher temperature.

The optimum temperature for the sintering will of course depend upon the precise composition of the material being sintered and its intended application. Suitable temperatures are in the range of from 1700° to 2500° C., especially from 1900° to 2400° C., most preferably 2050° to 2300° C. The body being sintered is raised to the desired temperature under nitrogen, which is preferably removed as soon as the desired temperature is reached. However, the body may be held for a period of time at the sintering temperature under nitrogen if desired. The nitrogen is removed by evacuating down to a pressure of less than $10^{-2}$ mbar, preferably less than $10^{-4}$ mbar, and especially less than $10^{-6}$ mbar. It is preferred to remove the nitrogen as rapidly as possible. The vacuum may for example be achieved using a rotary pump or, for very high vacuum, a diffusion pump. The optimum rate of heating to bring the body up to sintering temperature will depend primarily upon the size of the body. Heating rates in the range of from 3° to 30° C. per minute are generally suitable.

Following the removal of the nitrogen, the body is held at the sintering temperature for the desired period either under vacuum or in the presence of an inert gas. Helium or, especially, argon, are preferred inert gases. This stage of the sintering is continued until the desired degree of sintering is obtained. Times for this phase of, for example, 0.25 to 10 hours, preferably 0.5 to 5 hours, are generally suitable.

Both the nitrogen and the other inert gas, when used, are preferably used at atmospheric pressure. However, they may, if desired, be used at higher or lower pressures.

The body to be sintered comprises silicon carbide. The body may also include a wide range of other additives as desired. The body contains a boron-containing material. Such materials include elemental boron, boron carbide, titanium diboride and boron nitride. Boron-containing materials act as sinter aids, and preferably a boron-containing sintering aid is present in the body in an amount of from 0.1 to 2%, preferably 0.2 to 1.5% w, calculated as elemental boron. However, if desired, the body may contain a very much larger quantity of a boron-containing material, for example up to 40%, especially up to 30% w, in which case the body is best regarded as being composed of a composite material.

The body to be sintered may also contain elemental carbon or a compound decomposable to give elemental carbon. Elemental carbon acts as a sinter aid, and is usually introduced into the initial preparation stages of the body in the form of an organic compound which is burned off during heating of the body, leaving a residue of elemental carbon. Suitable compounds include organic polymers, for example phenolic resins such as the novolac resins, resorcinol-formaldehyde, aniline-formaldehyde and cresol-formaldehyde resins, and hydrocarbyl polymers such as polyphenylene or polymethylphenylene. Such a resin can serve the function of a binder in the initial formation of the body. The quantity of carbon present may for example be up to 10%, for example, from 0.01 to 10% w, preferably up to 5%, e.g. from 0.2 to 5% w. It is a major advantage of the process of the invention that materials with a low carbon content can be sintered as effectively as those with a high carbon content.

The body to be sintered may be produced by conventional methods. A convenient method of formation of the body comprises mixing the silicon carbide and the boron-containing material in powder form in the presence of a suitable liquid, preferably an organic solution of an organic compound which acts as source of carbon sinter aid. Wet milling followed by drying and optionally further dry milling produces a homogeneous powder.

This may be formed into the green body by any convenient method, for example uniaxial pressing, slurry pressing, tablet pressing or cold isostatic pressing, followed by heating, preferably under vacuum, which removes volatiles and decomposes the organic polymer to give elemental carbon as a sinter aid. A preferred method involves cold isostatic pressing at a pressure of from 50 MPa to 500 MPa, followed by heating under vacuum to a temperature in the range of from 200° to 260° C.

Using prior art sintering processes, it has not proved possible to prepare high-quality silicon carbide bodies containing low amounts of free carbon. The process of the present invention permits the production of a novel sintered material. Accordingly, the present invention provides a sintered body comprising silicon carbide and a boron-containing material, having a density of at least 96%, preferably at least 98%, of its theoretical maximum density, characterised in that the body contains less than 0.7% w of free carbon, and has a mean silicon carbide grain size of less than 5 microns.

Preferably the materials of the present invention contain less than 0.5, especially less than 0.3% w of free carbon.

Grain size is measured by assessing the minimal prism diameter in the case of anisotropic crystals. It may be measured directly from SEM micrographs of specimens of the material.

The materials may for example contain up to 30% w of boron-containing material, but preferably contain from 0.1 to 2% w, especially 0.2 to 1.5% w, calculated as elemental boron.

The following Examples illustrate the invention.

EXAMPLE 1

Preparation of Sinterable Compositions and Green Body Formation

Three sinterable alpha silicon carbide ceramic compositions, labelled A, B and C, were prepared from commercially available powders as detailed in Table 1, which lists the Trade Marks of the powders.

TABLE 1

| Power Additions | Sample Compositions | | |
|---|---|---|---|
| | A | B | C |
| Lonza UFIS SiC | 1737 g | — | — |
| Starck A10 SiC | — | 1737 g | 1737 g |
| Starck F1500 B$_4$C | 11.5 g | 11.5 g | 11.5 g |
| BP Novolac J1011H | 33 g | 11 g | 33 g |

Composition A was prepared with silicon carbide powder supplied by Lonza (Waldshut, W. Germany) while Compositions B and C were prepared with powder supplied by H. C. Starck (Berlin). These powders have different particle size distributions and different impurity contents. It is generally observed that Lonza silicon carbide requires a higher carbon content for successful sintering and Composition A most closely resembles Composition B (rather than Composition C) in terms of sintering behaviour and final free carbon content in the sintered state.

The novolac was dissolved in boiling isopropanol, and mixed with the silicon carbide and boron carbide. The resulting mixture was wet milled along with 1800 g silicon carbide mill media for 72 hours in a 51 plastic mill bottle, at the end of which period the product was sieved through a 90 micron mesh sieve and dried. It was then dry milled in a 51 plastic mill bottle for 4 hours together with 900 g of silicon carbide mill media, after which it was again sieved through a 90 micron mesh sieve.

Prior to sintering the sinterable powders were cold formed into cylindrical specimens of diameter 1 cm and mass 10 g by cold isostatic pressing at 400 MPa. Specimens were placed in a vacuum oven. By heating to 230° C. for 4 hours under vacuum, volatiles were removed from the specimen and the novolac addition cured: the novolac decomposes to leave around 50% of its original weight as carbon sinter aid.

EXAMPLE 2

Green specimens prepared as in Example 1 were placed in a silicon carbide/boron carbide powder bed inside a carbon crucible and loaded into a sinter furnace. Nitrogen at 1 atmosphere was introduced, and the temperature was raised at 10° C. per minute, with a 15 minute dwell at 1600° C., to 2000° C. This temperature was held for 1 hour, following which the furnace was evacuated down to a pressure, measured at the cold wall, of less than $10^{-3}$ mbar and the temperature held for a further 9 hours under vacuum. The density of the resulting bodies is given in Table 2. It can be seen that for all samples, extremely high densities were obtained.

EXAMPLE 2(A)

Comparative

The procedure of Example 2 was followed, except that the whole of the process was carried out under vacuum- i.e. heating plus 10 hours at 2000° C. The results are given in Table 2. Poor results are obtained: as expected, the only composition to attain a reasonable density was Composition C, containing a high proportion of free carbon.

EXAMPLE 3

The temperature of a furnace containing green specimens was raised to 2080° C. as described in Example 2, following which the nitrogen was removed down to a pressure of less than $10^{-3}$ mbar and sintering was continued for 5 hours under vacuum. Extremely high densities were obtained, detailed in Table 2.

EXAMPLE 3(A)

Comparative

The procedure of Example 3 was repeated except that heating under nitrogen was replaced by heating under vacuum. The results, given in Table 2, show that only in the case of the high-carbon material was a reasonable density obtained.

EXAMPLE 4

The procedure of Example 3 was repeated, except that sintering under vacuum was continued for only 3 hours. The results are shown in Table 2.

EXAMPLE 5

The temperature of green specimens was raised to 2080° C. as described in Example 2. The nitrogen was removed by evacuation down to a pressure of less than $10^{-3}$ mbar over a period of about half an hour, following which argon at 1 atmosphere was introduced. Sintering was continued for a further period of about 2½ hours, giving a total time at sintering temperature of 3 hours. The results are given in Table 2.

EXAMPLE 6

The procedure of Example 3 was followed, except that the sinter temperature was 2180° C. and sintering time under vacuum was only 2 hours. Results are given in Table 2.

EXAMPLE 6(A)

Comparative

The procedure of Example 6 was followed except that the whole process was carried out under nitrogen, and the body was held at sinter temperature for 5 hours. Even after this long sinter time, results much inferior to these of Example 6 are obtained, as shown in Table 2.

TABLE 2

| Example No. | Sinter Temperature T °C. | Sinter Treatment | Density, % theoretical Composition | | |
|---|---|---|---|---|---|
| | | | A | B | C |
| 2 | 2000 | Raise to T under N₂, hold at 1 hour under N₂, then 9 hours under vacuum | 96.51 | 93.60 | 94.64 |
| 2(A) (Comparative) | 2000 | Raise to T then 10 hours all under vacuum | 72.19 | 84.77 | 93.28 |
| 3 | 2080 | Raise to T under N₂, then 5 hours under vacuum | 98.23 | 96.43 | 96.68 |
| 3(A) (Comparative) | 2080 | Raise to T then 5 hours, all under vacuum | 86.98 | 84.12 | 96.44 |
| 4 | 2080 | Raise to T under N₂, and then 3 hours under vacuum | 97.93 | 95.79 | 96.73 |
| 5 | 2080 | Raise to T under N₂, evaculate ½ hour, then 2½ hours under argon | 98.79 | 95.70 | 97.16 |
| 6 | 2180 | Raise to T | 98.21 | 97.47 | 97.94 |

TABLE 2-continued

| Example No. | Sinter Temperature T °C. | Sinter Treatment | Density, % theoretical Composition | | |
|---|---|---|---|---|---|
| | | | A | B | C |
| | | under N₂, then 2 hours under vacuum | | | |
| 6(A) (Comparative) | 2180 | Raise to T then 5 hours, all under N₂ | — | 89.50 | 90.06 |

EXAMPLE 7, EXAMPLE 7(A) (COMPARATIVE) AND EXAMPLE 7(B) (COMPARATIVE)

Tests were carried out to compare products manufactured as described in Japanese Patent Application No. 60-5071 with products manufactured in accordance with the present invention. Two powder samples were prepared. The sample of Example 7(A) was as close a replica as possible to the starting material described in the Examples of JP 60-5071. The sample of Example 7 was a boron-containing sample in accordance with the invention. The sample of Example 7 was also used in Example 7(B).

EXAMPLE 7

1737.00 g of alpha silicon carbide powder (H. C. Stark, grade A10) was mixed with 11.4998 g of boron carbide powder ($B_4C$, H. C. Stark, grade f1500), and 12.375 g of Resol resin (BP grade J2022A). The powders were dispersed in 1 molar ammonium hydroxide, ball milled for 72 hours with SiC media, passed through a 90 micron sieve and oven tray dried overnight. The dried agglomerates were dry milled and sieved through a 90 micron sieve. Tiles of this material were uniaxially die pressed and then isostatically pressed at 30 ksi for 1 minute. Specimens of size 60×15×15 mm were cut from the tile.

Specimens were loaded into a graphite crucible on trays and placed in a furnace for densification. Heat was applied using a graphite resistance element and controlled with optical pyrometry and thermocouples.

Starting from a vacuum of $4 \times 10^{-4}$ mbar, the temperature was ramped at 10° C. per minute to 1100° C. Nitrogen at 1 bar was introduced. Maintaining this atmosphere, the temperature was ramped at 10° C. per minute to 1600° C. After 15 minutes, the temperature was ramped again at 10° C. per minute to 2180° C. The furnace was then evacuated down to a vacuum of $4 \times 10^{-4}$ mbar, following which argon at 1 bar was introduced. The total time at 2180° C. was 30 minutes, following which the temperature was ramped at 20° C. per minute down to 1800° C., and then allowed to cool.

Figure 2:
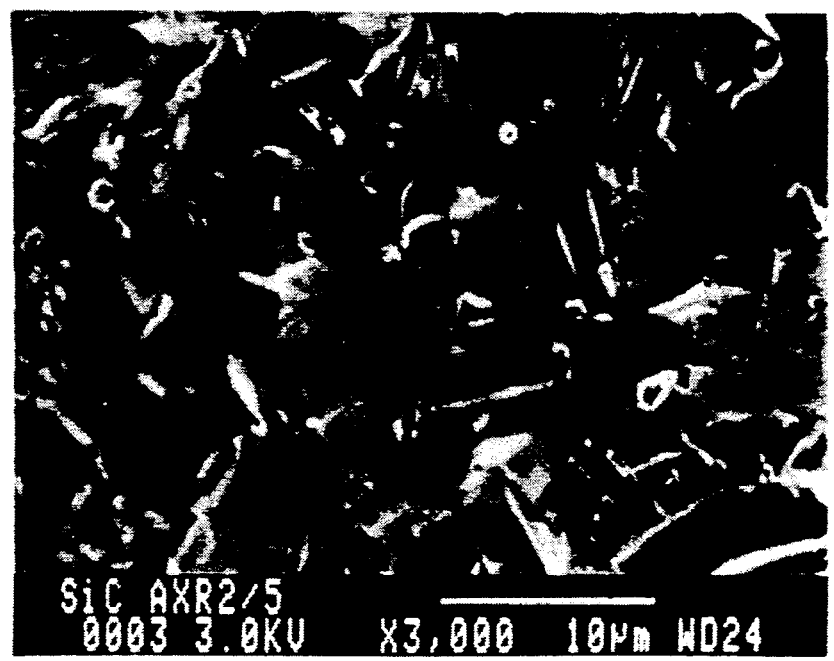

The density of the product was found to be 98.17% of theoretical maximum. SEM showed the mean grain size to be less than 5 microns, and the free carbon was 0.1% w. FIG. 1 of the accompanying drawings shows an SEM micrograph of the material at magnification 1500. FIG. 2 of the accompanying drawings show an SEM micrograph of the material at magnification 3000.

EXAMPLE 7(A)

Comparative 486.70 g of beta silicon carbide powder (H. C. Stark, grade B10) was mixed with 13.30 g of Resol resin (BP, grade J2022A). The powders were dispersed in 1 molar ammonium hydroxide with stirring and ultrasonic agitation. The product was freeze-dried overnight.

Samples were prepared and loaded into a furnace as in Example 7, and then treated as described in JP 60-5071. Starting in an atmosphere of 50 mbar nitrogen, the temperature was ramped at 5° C. per minute to 1600° C., and held there for 20 minutes. At 1600° C., 60% $N_2$/40% Ar at 1 bar was flowed over the specimens, and, maintaining this atmosphere, the temperature was ramped at 5° C. per minute to 2200° C. The nitrogen content of the atmosphere was then reduced linearly over the next 30 minutes until a pure argon flow was obtained. After this 30 minutes at 2200° C., the temperature was ramped at 20° C. per minute to 1800° C., and then allowed to cool.

The density of the resultant product was 62.23% of theoretical maximum.

EXAMPLE 7(B)

Comparative

This Example demonstrates the effect of operating the process of JP 60-5071 on a boron-containing sample of silicon carbide.

The procedure of Example 7(A) was repeated exactly except that the sample of Example 7 was used. The density of the resultant product was 96.82% of theoretical maximum.

I claim:

1. A process for the sintering of a body comprising silicon carbide and a boron-containing material selected from the group consisting of elemental boron, boron carbide, titanium diboride and boron nitride in an amount ranging from 0.1 to 40% by weight calculated as elemental boron, commencing with heating the body to an effective sintering temperature in the presence of nitrogen, wherein the improvement comprises:
   removing the nitrogen by evacuation to a pressure of less than $10^{-2}$ mbar; and
   continuing the sintering under vacuum or in the presence of an inert gas other than nitrogen.

2. The process as claimed in claim 1, in which the sintering temperature is in the range of from 1700° to 2500° C.

3. The process as claimed in claim 2, in which the sintering temperature is in the range of from 1900° to 2400° C.

4. The process as claimed in claims 1, in which the sintering is continued in the presence of argon or under vacuum.

5. The process as claimed in claim 1, in which the body to be sintered comprises from 0.1 to 2% by weight of boron-containing material.

* * * * *